(12) United States Patent
Grochowski

(10) Patent No.: US 7,790,126 B2
(45) Date of Patent: Sep. 7, 2010

(54) METHOD FOR PURIFYING WASTE GASES OF A GLASS MELTING PROCESS, PARTICULARLY FOR GLASSES FOR LCD DISPLAY

(76) Inventor: Horst Grochowski, Lindnerstrasse 163, 46149-Oberhausen (DE)

( * ) Notice: Subject to any disclaimer, the term of this patent is extended or adjusted under 35 U.S.C. 154(b) by 157 days.

(21) Appl. No.: 11/795,106

(22) PCT Filed: Jan. 12, 2006

(86) PCT No.: PCT/EP2006/000242
§ 371 (c)(1),
(2), (4) Date: Dec. 5, 2007

(87) PCT Pub. No.: WO2006/084539
PCT Pub. Date: Aug. 17, 2006

(65) Prior Publication Data
US 2008/0206120 A1    Aug. 28, 2008

(30) Foreign Application Priority Data
Jan. 12, 2005    (DE) .................. 10 2005 001 595

(51) Int. Cl.
*B01D 53/34* (2006.01)
*B01D 53/46* (2006.01)
*B01D 53/56* (2006.01)

(52) U.S. Cl. .................. 423/210; 423/235; 423/239.1; 423/242.1; 423/240 R; 423/240 S; 423/245.1; 423/245.3; 423/215.5; 423/DIG. 16

(58) Field of Classification Search .................. 423/210, 423/235, 239.1, 242.1, 240 R, 240 S, 245.1, 423/245.3, 215.5, DIG. 16
See application file for complete search history.

(56) References Cited

U.S. PATENT DOCUMENTS 3,880,639 A    4/1975    Bodner et al.
4,221,768 A    9/1980    Inoue et al.

(Continued)

FOREIGN PATENT DOCUMENTS

DE    883598    3/1954

(Continued)

OTHER PUBLICATIONS

Notification of Transmittal of Translation of the International Preliminary Report on Patentability and Written Opinion of the International Searching Authority (Aug. 23, 2007).

*Primary Examiner*—Timothy C Vanoy
(74) *Attorney, Agent, or Firm*—Fay Sharpe LLP; Brian E. Turung

(57) ABSTRACT

The invention is directed to a method for cleaning exhaust gases of a glass melting process. The raw material for production of the glass is charged to the glass furnace and molten glass is removed from the glass furnace. The exhaust gases of the glass melting process are freed of the pollutant components in a moving bed reactor system on a catalytically active adsorbent and/or absorbent. Catalyst damaging pollutant components are bound by absorption and the particulate components are adhesively removed. Catalytic removal of nitrogen is performed in the layer area adjacent to the immediate oncoming flow area of the catalyst damaging pollutant components. Other pollutant components that do not damage the catalyst, such as dioxins and furans, are removed by absorption in the layer area.

26 Claims, 1 Drawing Sheet

U.S. PATENT DOCUMENTS

| | | | | |
|---|---|---|---|---|
| 4,325,922 | A | * | 4/1982 | Bryant ........................ 423/210 |
| 4,328,020 | A | * | 5/1982 | Hughes .......................... 65/27 |
| 4,372,770 | A | * | 2/1983 | Krumwiede et al. ........... 65/27 |
| 4,631,178 | A | | 12/1986 | Rapp et al. |
| 5,766,555 | A | * | 6/1998 | Grochowski ................ 422/129 |
| 5,833,730 | A | * | 11/1998 | Quirk et al. ................. 65/134.6 |

FOREIGN PATENT DOCUMENTS

| | | |
|---|---|---|
| EP | 0995495 | 4/2000 |
| JP | 51129871 | 11/1976 |

* cited by examiner

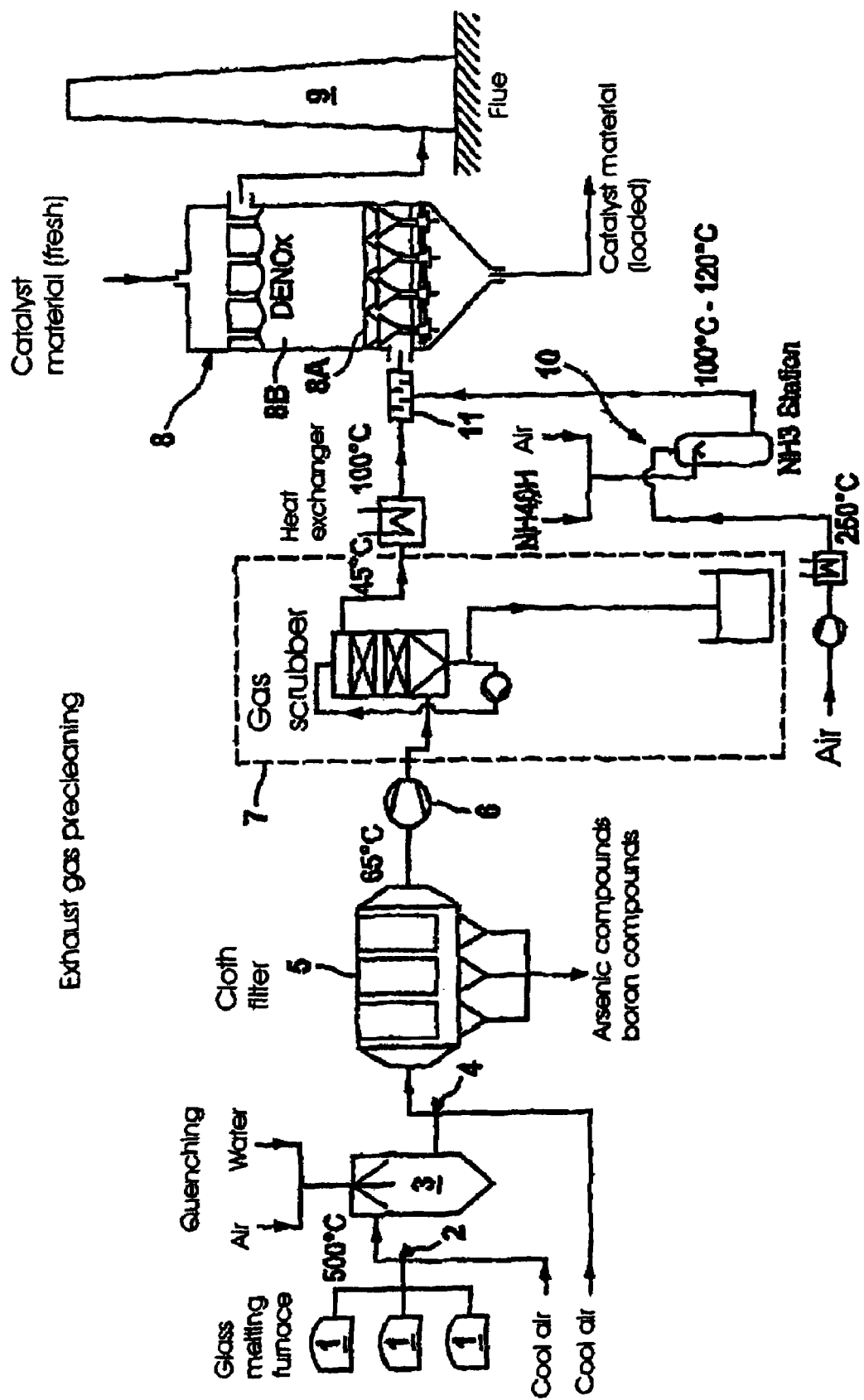

METHOD FOR PURIFYING WASTE GASES OF A GLASS MELTING PROCESS, PARTICULARLY FOR GLASSES FOR LCD DISPLAY

The invention relates to a method for cleaning exhaust gases from a glass melting tank.

BACKGROUND OF THE INVENTION

The hot exhaust gases generated in glass melting contain nitrogen oxides ($NO_x$) to a great extent in addition to $CO_2$, $O_2$, $H_2O$ and $N_2$. Nitrogen oxides must be removed from the exhaust gas because they are environmental toxins. This $NO_x$ cleaning may be complex under some conditions because multiple pollutant components are present in the exhaust gas and would act as so-called catalyst poisons to interfere with $NO_x$ cleaning and therefore must be mostly removed from the exhaust gas before the $NO_x$ cleaning begins. Typical pollutant components which may be present in the exhaust gases from a glass melting tank include $SO_2$, HCl, heavy metals, in particular Hg, dioxins, furans and condensable residues as well as dusts. The boron and/or arsenic compounds, which are often present in the exhaust gas, are especially problematical for cleaning exhaust gas from glass melting tanks, but other problematical substances include calcium, strontium and barium compounds and/or other constituents originating from additives to the $SiO_2$-based raw material for making glass. The corresponding pollutant components occur in a wide variety of types of glass, in particular those that are used for LCD screens. In many cases, compounds containing arsenic are added to a glass melt to make the melt as liquid and free of bubbles as possible. The boron nitrate added to many types of glass results in a high $NO_x$ content in the exhaust gas. Other additives that evaporate as such or in a different form from the glass melt usually also include pollutants which must be removed from the process exhaust gas (exhaust gas from combustion and from the glass melting process).

In the past, exhaust gas at approximately 1650° C. would be cooled greatly, especially by diluting it with air and/or by quenching to yield temperatures suitable for use of a bag filter as a precleaning stage, for exhaust gas cleaning of the glass furnace exhaust gases. The boron and arsenic compounds present in the exhaust gas go directly from the gas phase to the solid phase at temperatures between 85° C. and 100° C. When the exhaust gas is cooled, complete sublimation of the aforementioned pollutant components is not achieved. The degree of cleaning that can be achieved with a bag or cloth filter depends on the particle size. This in turn depends on the temperature, the gas pressure and the gas dwell time in the evaporative cooler (quenching). The lowest possible temperature and a relatively long dwell time would thus have to be selected to achieve a sufficient particle size so that then the particles could be separated by a bag or cloth filter. Whether boron and arsenic compounds already undergo sublimation in the evaporative cooler at the temperatures occurring on the bag filter, the crystals thus formed are very small. Furthermore, the formation of crystals, as mentioned above, requires a certain dwell time in the sublimation temperature range. Most boron and arsenic compounds are therefore not adequately removed in the bag filter, so a subsequent wet scrubbing has been necessary to obtain a degree of precleaning that will allow a subsequent $NO_x$ cleaning without excessively great damage to the catalyst. However, wet scrubbing leads to further environmental problems because the washing liquid in turn must be freed of the components contained therein before the washing liquid is reused or removed from the process as wastewater. The gas cleaning problem has thus been shifted to a wastewater purification problem.

A large number of methods that can be used commercially such as SCR, SNCR and scrubbing with oxidizing agents are known for reducing the $NO_x$ content. Apart from scrubbing with oxidizing agents, all the methods used commercially so far operate above a minimum exhaust gas temperature, which is at least 160° C. (low-temperature catalysts) and is generally above 300° C. For the most popular technology using catalysts, the pollutant components mentioned above constitute catalyst poisons to at least some extent.

SUMMARY OF THE INVENTION

In view of the current state of the art, it is an object of the present invention is to simplify generic cleaning methods for exhaust gases from a glass melting tank to the extent that a high degree of $NO_x$ separation is possible with fewer process steps than those described previously. The method of the present invention is to solve this objection. The present invention is directed to method for cleaning exhaust gases of a glass melting process, in which the raw material for production of the glass containing $SiO_2$, additives such as boron, arsenic and/or other compounds, in particular metal compounds is charged to the glass furnace and molten glass is removed from the glass furnace. The glass furnace is heated by means of hot combustion exhaust gases, and in which the exhaust gas of the glass melting process which originates from the combustion exhaust gas and/or the glass melt comprises, in addition to gas components such as $CO_2$, $O_2$, $H_2O$ and/or $N_2$, at least $NO_x$ and compounds escaping from and/or formed from the raw material as pollutant components. The exhaust gases of the glass melting process are essentially freed of the pollutant components in one and the same moving bed in at least two stages, in a moving bed reactor system on at least one catalytically active adsorbent and/or absorbent. In the immediate oncoming flow area, at least those of the catalyst damaging pollutant components that damage the catalyst and originate from the composition of the raw material, are bound by absorption and the particulate components are adhesively removed, and catalytic removal of nitrogen is performed to a great extent in the layer area adjacent to the immediate oncoming flow area and other pollutant components that are optionally present but do not damage the catalyst, such as dioxins and furans, are removed by absorption in this layer area. A cloth filter or an electrostatic filter can be provided upstream from the moving bed reactor system. The gas cleaning can be performed in the moving bed reactor system at a gas inlet temperature between 70° C. to 160° C. The exhaust gas of the glass melting process can be first cooled and/or quenched in one or more stages. The pollutant components to be removed can consist essentially of arsenic and/or boron compounds. The pollutant components to be removed in the first separation stage can include silicon, calcium, strontium and/or barium compounds. Up to 80% or more of the nitrogen can removed by adding ammonia. The moving bed reactor system can be a countercurrent moving bed reactor system. The moving bed reactor system, the cycles in which the adsorbent and/or absorbent are removed from the lower end of the moving bed and fresh or regenerated adsorbent and/or absorbent that are replenished at the upper end of the moving bed can be carried out as a function of one of (i) the flow-through pressure drop suffered by the exhaust gas to be cleaned over the flow-through depth or a partial depth of the moving bed, or (ii) the damage suffered by the adsorbent and/or absorbent due to the catalyst damaging gaseous components in the oncoming flow area. The adsorbent and/or absorbent can consist(s) of a mixture of carbonaceous adsorbents and/or absorbents. The adsorbent and/or absorbent can be activated coke and/or granules consisting of inorganic components or a mixture of inorganic plus organic components/ingredients. The exhaust gas can comprise at least one agent selected from the group consisting of $SO_2$, HCl, heavy metals, dioxins, furans, dust condensable residues, sublimates and combinations thereof. The heavy metals can include Hg. The glass melting process can be for producing glass for LCD screens. The exhaust gases of the glass melting process can be essentially freed of the pollutant components in the moving bed in at least two stages, after a precleaning stage. The catalyst damaging pollutant components can be bound in a neighboring lower layer of the moving bed and is a first separation stage. The catalyst damaging pollutant components can comprise at least one of boron and arsenic compounds. The layer area can be a second separation stage. Catalytic removal of nitrogen can be performed to a great extent in the layer area adjacent to the immediate oncoming flow area and to the neighboring lower layer of the moving bed. The exhaust gas can be cooled and/or quenched with the addition of at least one of diluting air and water, to temperatures between 50° C. and 120° C. The exhaust gas can be cooled to temperatures between 60° C. and 100° C. Up to 90% or more of the nitrogen can be removed by adding ammonia. The function (ii) can be the damage suffered by the adsorbent and/or absorbent due to the catalyst damaging gaseous components in the oncoming flow area and in a neighboring lower area. The mixture of carbonaceous adsorbents and/or absorbents can be stratified. The mixture of adsorbents and/or absorbents can consist of activated coke and reagents. The reagents can include alkalies for acidic pollutant components. The gas cleaning can be performed in the moving bed reactor system at a gas inlet temperature between 90° C. to 120° C.

The invention is thus based on the idea of cleaning the exhaust gases generated in glass melting—optionally after a precleaning stage—in a single moving bed on at least one catalytically active adsorbent and/or absorbent in two stages, i.e., absorptively binding the catalyst poisoning pollutant components, in particular boron and/or arsenic compounds, and adhesively removing particulate components, in the direct oncoming flow area and optionally in the layer of the moving bed material immediately following the direct oncoming flow area, and in the second cleaning step, removing most of the nitrogen in the layer of the moving bed following the first cleaning step in the direction of gas flow. The absorption or adsorption material in the moving bed thus undergoes a two-step process in which freshly charged material is catalytically converting $NO_x$ to harmless $N_2$ and water vapor, preferably with the addition of ammonia, and during the remaining dwell time in approach to the oncoming flow area of the moving bed the remaining pollutant components are removed by adsorption, absorption or adhesive binding and then the absorption or adsorption material is discharged from the moving bed. In the sense of the present invention, adsorption is understood to refer to a process in which one or more components is/are removed from the exhaust gas by adsorption. Absorption is understood in the sense of the present invention to mean that the substances originating from the exhaust gas to be cleaned first undergo a chemical reaction and are adsorbed only thereafter.

The method described below as carbon selective catalytic reduction (CSCR) according to the present invention ensures a high separation of $NO_x$ with special emphasis on extremely fine gaseous and dust particles. This method preferably operates at a temperature between 90° C. and 160° C., but the preferred operating temperature is between 90° C. and 110° C.

Activated coke as well as mixtures of carbonaceous adsorbents and/or absorbents with reactive agents, in particular those for acidic pollutant components, e.g., lime, may be used as the catalytically active adsorbents and/or absorbents. A special activated coke and/or granules composed of inorganic components or a mixture of inorganic components plus organic components/ingredients is preferred for use.

In addition to the components that are especially typical of the glass melting process and originate from additives to the basic material, e.g., boron and/or arsenic compounds, the gaseous pollutant components that damage the catalyst and are removed in the first cleaning stage as seen in the direction of gas flow in the moving bed reactor in the oncoming flow area and are optionally also removed in the immediately following layer, include $SO_2$, HCl, condensable residues, heavy metals and particulate components, e.g., dust and crystals such as those which also occur in very small particle sizes in gas sublimation and are especially critical.

The present invention achieves the following advantages, among others:

Economic Aspect

The gas cleaning can be operated as an uninterrupted process until the glass melt is brought to an end. When using traditional SCR catalysts, an adequate lifetime of the catalyst is not achieved. Since a glass melt is not shut down until the lining of the furnace must be replaced and/or cannot be shut down and started up again, a catalyst having a minimum lifetime corresponding to the running time of the glass melt would have to be found or two DENOx systems would have to be built so that it would be possible to switch between them. This procedure would make the glass production process much more expensive.

Due to the omission of the wet scrubbing stage, which becomes possible through this invention, this eliminates not only the investment costs and operating costs but also most of the energy costs for reheating. The required water purification of the wastewater from wet scrubbing would constitute another substantial cost factor. Finally, lowering the water vapor content in the exhaust gas would have a positive effect on the DENOx process and would lead to a reduction in the required adsorption/absorption mass.

Ecological Aspect

Due to the elimination of the wet scrubbing stage, this also eliminates the environmental pollutants from the remaining residual concentration in the purified wash water.

The aforementioned components that are to be used according to this invention as well as those that are described in the exemplary embodiments are not subject to any particular boundary conditions with regard to their size, shape, choice of materials and technical design, so that the selection criteria known in this area of application may be employed without restriction.

Additional details, features and advantages of the subjects of the present invention are derived from the following description of the respective drawing and tables, which show an exemplary embodiment of an exhaust gas cleaning system for glass furnace exhaust gases as an example.

DESCRIPTION OF THE DRAWING

FIG. 1 shows as an example a block diagram of an inventive cleaning method for the exhaust gases of a glass melting process in accordance with the present invention.

DETAIL DESCRIPTION OF AN EMBODIMENT OF THE INVENTION

One or more glass melting furnaces 1 are heated in the usual way with hot combustion exhaust gases from combustion of gaseous and/or liquid fuels, whereby the raw material that is charged at one end of the respective glass melting tank and contains $SiO_2$ plus additives is melted and discharged at the other end of the furnace. The exhaust gases thereby generated are composed of the combustion exhaust gases and also the gases escaping from the glass melt. These gases, which are referred to jointly as exhaust gases of the glass melting process, are cooled from initially approximately 1650° C. to approximately 500° C. by adding cooling air at two designated locations. The gas cooled in this way is sprayed with water and cooled further in a quenching device labeled as 3. At a downstream location labeled as 4, the gases may be cooled further to approximately 65° C., with the temperature established being selected so that it allows not only precleaning of the gas on a bag or cloth filter labeled as 5, but also sublimation processes can take place upstream from the bag or cloth filter and the crystals of the sublimate can be captured in the bag or cloth filter to a certain extent. Although a further reduction in temperature is desirable to achieve the highest possible sublimation rate, the dew point of the exhaust gas prevents this. In this way, the arsenic and/or boron compounds which are catalyst poisons and are present in the exhaust gas from the glass melting process are captured at least partially. Because of the small crystal size of such sublimates and the minimum required dwell time at the sublimation temperature, however, the bag or cloth filter 5 allows a portion of the arsenic and/or boron compounds to pass through in either gaseous or solid form. They may be partially removed together with other water-soluble salts in a downstream wet scrubbing stage as labeled as 7 on the whole, which may have a fan 6 upstream. Moreover, catalyst poisons such as HCl and $SiO_2$ can be removed at least partially in the wet scrubbing stage. This is optionally accomplished with the addition of a reducing agent such as NaOH. The wash water thereby obtained must be after-treated. Furthermore, the exhaust gas leaving this stage at a temperature of approximately 45° C. must then be heated.

It has been found that a DENOx plant can also be operated successfully without an upstream exhaust gas scrubber while achieving an equally high degree of separation of $NO_x$. In this case, however, it is usually necessary to increase the amount of granules removed from the reactor, i.e., the granule throughput. However, the exhaust gas always still contains remaining traces of gaseous and sublimable pollutant components. The exhaust gas is brought from 45° C. to the reaction temperature of approximately 100° C. by means of a heat exchanger. Before entering the exhaust gas that has been cleaned in this way, $NH_3$ is mixed with it. At any rate, the exhaust gas precleaned in the bag or cloth filter 5 is sent to a moving bed reactor system 8, which is essentially known, as described in detail in WO88/08746, for example, and is preferably designed as a countercurrent moving bed reactor system, in which the exhaust gas to be cleaned is charged from beneath through an oncoming flow plate, preferably one such as that known from WO88/08746, an adsorbent layer of a suitable layer thickness and material composition moving from top to bottom. At the top end of the adsorbent layer, the outgoing gas is discharged from the moving bed reactor system and sent to a flue 9, for example. Fresh or regenerated absorbent, preferably activated coke, optionally mixed with lime or the like is charged in cycles to the layer of adsorbent, while spent adsorbent is removed in cycles on the oncoming flow plate.

The optimal quantity of granules discharged is reached when the pollutant gas and dust components input are discharged with the granules.

The first separation stage 8A is situated in the immediate oncoming flow area and optionally in a lower layer of the moving bed adjacent thereto toward the top. The exhaust gas entering the first separation stage at temperatures on the order of 100° C. (higher and lower temperatures are possible) is subjected to a first cleaning on the adsorbent and/or absorbent. At least the catalyst damaging compounds such as boron and/or arsenic compounds originating from the composition of the raw material of the molten glass are bound by adsorption and/or absorption. Furthermore, any dust and/or particulate components that might be present in particular, also including sublimation crystals, will adhere to the absorbent and/or adsorbent of the first separation stage 8A. If the exhaust gas still contains $SO_2$, HCl, heavy metals and/or condensable residues at this point, they are also separated—at least for the most part—in this first separation stage 8A.

The adsorbent and/or absorbent layers which follow thereafter form the second separation stage 8B and are essentially free of catalyst damaging components, so that the $NO_x$ present in the exhaust gas can be converted catalytically to $N_2$ and $H_2O$ with the addition of $NH_3$ or urea, for example. At the same time, other gaseous pollutants such as dioxins and furans—if present—are bound by adsorption. In this way, the $NO_x$ is surprisingly more than 90% removed in at least two stages in one and the same moving bed reactor. The catalyst poisons separated in the first separation stage are removed in cycles together with the spent adsorbent and/or absorbent, so that adsorbent and/or absorbent layers situated at a higher level are not damaged. If the wet scrubbing stage 7 is omitted—as is fundamentally possible—a completely dry gas cleaning process is thus obtained—as is preferred.

For the addition of $NH_3$, urea or other substances, it has proven especially advantageous to use a premixer 10, in which ammonia-water is vaporized with air through a two-component nozzle into a stream of air at 200-260° C. In a downstream mixer 11, the mixture, cooled to approximately 100-120° C., is added to the precleaned stream of gas before it enters the moving bed reactor system 8.

EXEMPLARY EMBODIMENT

In a glass melt, raw material containing silicon mixed with special additive materials and/or accompanying substances such as boron and arsenic compounds is melted at a temperature of approximately 1650° C.

The melting is performed using natural gas as a fuel and pure oxygen (instead of air). Since the additives are partially nitrate/nitrite compounds, the exhaust gas contains high concentrations of gaseous pollutant components such as $NO_x$ and gaseous boron and arsenic compounds. Therefore, the pollutant concentration level of the exhaust gas must be lowered to a level required by law before it can be discharged into the atmosphere through the flue.

The exhaust gas to be cleaned is passed through a two-stage DENOx reactor, which is operated as a moving bed reactor with regard to the granules. As they flow through the granule bed from bottom to top, the gaseous pollutant components are taken up by the granules by adsorption and stored in the pore system of the granules. The moving granular bed at the same time acts as a highly active fixed bed filter for extremely fine dust particles.

For $NO_x$ separation, the catalytic effect of the granules is utilized. To reduce $NO_x$, $NH_3$, urea or other $NO_x$ reducing components are added to the exhaust gas. The exhaust gas is then cleaned essentially in two stages, whereby the exhaust gas is precleaned after the first stage to the extent that there is little or no significant influence on the catalytic property of the granules for separation of $NO_x$.

The granules in the area of oncoming flow become loaded with the aforementioned pollutant components, which thus has a negative influence on the catalytic properties.

By controlled discharge of loaded granules which are thus catalytically damaged, the contaminated bed height is kept small in comparison with the total bed height of the bed of granules. In sedimentation of the bed of granules, fresh granules are replenished from the storage hopper through the force of gravity, so that the total layer height of the granule bed is always kept constant.

The second step is understood to refer to the exhaust gas cleaning of $NO_x$ in which the $NO_x$ reacts with $NH_3$ to form $N_2+H_2O$.

Under the operating conditions of an exhaust gas temperature of 100° C., a $NO_x$ starting concentration of 450 ppm and in the presence of at least some of the aforementioned sublimable pollutant components, a degree of separation of 90% to more than 95% is achieved.

I claim:

1. A method for cleaning exhaust gases of a glass melting process wherein a raw material for production of the glass is charged to a glass furnace and molten glass is removed from the glass furnace, wherein said raw material includes $SiO_2$ and one or more materials selected from the group consisting of boron, arsenic, and metal compounds, wherein said glass furnace is at least partially heated by means of hot combustion gases, wherein the exhaust gases of the glass melting process originate from one or more materials selected from the group consisting of said combustion gases and the raw material, wherein the exhaust gases include one or more materials selected from the group consisting of $CO_2$, $O_2$, $H_2O$, $N_2$, $NO_x$, compounds escaping from the raw material and compounds formed from the raw material, wherein the exhaust gases of the glass melting process are essentially freed of pollutant components in at least two stages in a moving bed reactor, said moving bed reactor including at least one material selected from the group consisting of a catalytically active adsorbent and an absorbent, whereby in the immediate oncoming flow area of said moving bed reactor, at least one catalyst damaging pollutant component in the exhaust gasses that damage catalyst and which originate from the raw material is at least partially bound by absorption and particulate components in said exhaust gasses are at least partially adhesively removed in a first stage of said moving bed reactor, and catalytic removal of nitrogen oxides in said exhaust gasses is performed to a great extent in a second stage that is positioned in a layer area adjacent to the immediate oncoming flow area, and one or more non-catalyst damaging pollutant components that are present in said exhaust gasses are at least partially removed by absorption in said adjacently positioned layer area.

2. The method as defined in claim 1, wherein a bag filter or an electrostatic filter is provided upstream from the moving bed reactor.

3. The method as defined in claim 1, wherein cleaning of said exhaust gases is performed in the moving bed reactor at a gas inlet temperature of 70° C. to 160° C.

4. The method as defined in claim 3, wherein cleaning of said exhaust gases is performed in the moving bed reactor at a gas inlet temperature of 90° C. to 120° C.

5. The method as defined in claim 1, wherein the exhaust gasses of the glass melting process are first cooled, quenched, or combinations thereof in at least one stage.

6. The method as defined in claim 5, wherein the exhaust gases are cooled, quenched, and combinations thereof with the addition of at least one of diluting air and water to temperatures of 50° C. to 120° C.

7. The method as defined in claim 6, wherein the exhaust gases are cooled to temperatures of 60° C. to 100° C.

8. The method as defined in claim 1, wherein the pollutant components to be removed consist essentially of arsenic compounds, boron compounds, and combinations thereof.

9. The method as defined in claim 1, wherein the pollutant components to be removed in the first include one or more materials selected from the group consisting of silicon compounds, calcium compounds, strontium compounds and barium compounds.

10. The method as defined in claim 1, wherein up to 80% or more of the nitrogen oxides are removed by adding ammonia.

11. The method as defined in claim 10, wherein up to 90% or more of the nitrogen oxides are removed by adding ammonia.

12. The method as defined in claim 1, wherein the moving bed reactor is a countercurrent moving bed reactor.

13. The method as defined in claim 1, wherein with the moving bed reactor, cycles in which the catalytically active adsorbent, absorbent, and combinations thereof is removed from a lower end of the moving bed reactor and fresh or regenerated catalytically active adsorbent, absorbent, and combinations thereof is replenished at an upper end of the moving bed reactor are carried out as a function of at least one of (i) the flow-through pressure drop suffered by the exhaust gases to be cleaned over the flow-through depth or a partial depth of the moving bed reactor, or (ii) the damage suffered by the catalytically active adsorbent, absorbent, and combinations thereof due to the catalyst damaging gaseous components in the oncoming flow area.

14. The method as defined in claim 13, wherein the function (ii) is the damage suffered by the catalytically active adsorbent, absorbent, and combinations thereof due to the catalyst damaging gaseous components in the oncoming flow area and in a neighboring lower area.

15. The method as defined in claim 1, wherein the catalytically active adsorbent, absorbent, and combinations thereof includes one or more materials selected from the group consisting of carbonaceous adsorbents and alkalies for acidic pollutant components.

16. The method as defined in claim 15, wherein catalytically active adsorbent, absorbent, and combinations thereof are stratified.

17. The method as defined in claim 15, wherein the mixture of catalytically active adsorbent, absorbent, and combinations thereof consist of activated coke and reagents.

18. The method as defined in claim 17, wherein the reagents include alkalies for acidic pollutant components.

19. The method as defined in claim 1, wherein the catalytically active adsorbent, absorbent, and combinations thereof includes one or more materials selected from the group consisting of activated coke, granules consisting of inorganic components, and a mixture of inorganic plus organic ingredients.

20. The method as defined in claim 1, wherein the exhaust gas gases include one or more agents selected from the group consisting of $SO_2$, HCl, heavy metals, dioxins, furans, dust condensable residues, and sublimates.

21. The method as defined in claim 20, wherein the heavy metals include Hg.

22. The method as defined in claim 1, wherein the glass melting process is for producing glass for LCD screens.

23. The method as defined in claim 1, wherein the exhaust gases of the glass melting process are essentially freed of the pollutant components in the moving bed in at least two stages after a precleaning stage.

24. The method as defined in claim 1, wherein the catalyst damaging pollutant components are bound in a neighboring lower layer of the moving bed reactor.

25. The method as defined in claim 24, wherein the catalyst damaging pollutant components include one or more compounds selected from the group consisting of boron compounds and arsenic compounds.

26. The method as defined in claim 24, wherein catalytic removal of nitrogen oxides is performed to a great extent in the layer area adjacent to the immediate oncoming flow area and to the neighboring lower layer of the moving bed.

* * * * *